United States Patent
Nakata

(10) Patent No.: US 8,555,845 B2
(45) Date of Patent: Oct. 15, 2013

(54) IDLE STOP CONTROLLER

(75) Inventor: Kazuhiro Nakata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1002 days.

(21) Appl. No.: 12/600,626

(22) PCT Filed: Apr. 2, 2008

(86) PCT No.: PCT/JP2008/000848
§ 371 (c)(1),
(2), (4) Date: Nov. 17, 2009

(87) PCT Pub. No.: WO2009/004751
PCT Pub. Date: Jan. 8, 2009

(65) Prior Publication Data
US 2010/0168992 A1  Jul. 1, 2010

(30) Foreign Application Priority Data

Jul. 5, 2007 (JP) ................................. 2007-177526

(51) Int. Cl.
*F02N 11/08* (2006.01)
(52) U.S. Cl.
USPC ..................................... 123/179.4; 123/179.3
(58) Field of Classification Search
USPC .............. 123/179.3, 179.4; 701/36, 112, 113; 340/3.42
See application file for complete search history.

(56) References Cited

U.S. PATENT DOCUMENTS

| | | | | |
|---|---|---|---|---|
| 2,960,082 A | * | 11/1960 | Smith | 123/179.31 |
| 2003/0016636 A1 | * | 1/2003 | Tari et al. | 370/328 |
| 2004/0260437 A1 | * | 12/2004 | Bauerle et al. | 701/36 |
| 2006/0082437 A1 | * | 4/2006 | Yuhara | 340/5.82 |

FOREIGN PATENT DOCUMENTS

| | | |
|---|---|---|
| JP | 8-61110 A | 3/1996 |
| JP | 2003-39976 A | 2/2003 |
| JP | 2004251234 * | 9/2004 |
| JP | 2006-316644 A | 11/2006 |
| JP | 2006-321345 A | 11/2006 |

OTHER PUBLICATIONS

Machine Translation of JP2006-316644.*

* cited by examiner

*Primary Examiner* — Willis R Wolfe, Jr.
*Assistant Examiner* — Anthony L Bacon
(74) *Attorney, Agent, or Firm* — Birch, Stewart, Kolasch & Birch, LLP

(57) ABSTRACT

An idle stop controller includes an idle stop mechanism 2 controlling the stop and the restart of an engine 1; a vehicle location detecting section 5 detecting a vehicle location; and a controller 4, when an ETC gate is retrieved within a predetermined region from a vehicle location detected by the vehicle location detecting section, prohibiting the idle stop mechanism from stopping the engine, and when no ETC gate has been detected within the predetermined region, releasing the prohibition.

7 Claims, 2 Drawing Sheets

IDLE STOP CONTROLLER

TECHNICAL FIELD

The present invention relates to an idle stop controller controlling an idle stop mechanism, which automatically stops an engine during halts and also automatically restarts the engine responding to start operations, and more particularly to a technology of controlling an idle stop mechanism in the vicinity of an ETC (Electronic Toll Collection; automatic toll collection) gate.

BACKGROUND ART

Conventionally, as a technology controlling the engine of a vehicle, known is a vehicle having an idle stop mechanism that automatically stops the engine during halts such as waiting at traffic lights, and automatically restarts the engine upon driver's start operations. Further, as another technology controlling the engine of a vehicle, known is a technology that controls the engine of a vehicle based on the signal provided by another system.

As the latter technology, e.g., Patent Document 1 discloses a running controller in which an ETC apparatus is mounted on a vehicle and the speed of the vehicle when the vehicle passes an ETC gate is controlled to prevent the running control from being performed against a driver's will, thus causing the vehicle to smoothly run. In the running controller, an ECU (Electronic Control Unit), when the vehicle approaches up to a predetermined approach distance or shorter (on the order of 500 m, e.g.) to an ETC gate detecting a vehicle passage and automatically collecting the toll, notifies the occupant of the vehicle that the ETC gate is present ahead. When the driver of the vehicle turns an ETC passage switch to the ON position to input the driver's intention to pass the ETC gate, the ECU starts ETC passing control and starts the acceleration/deceleration control of the vehicle such that the running speed of the vehicle detected by a vehicle speed sensor becomes a predetermined gate passing target speed of the vehicle, which is previously set (about 20 km/h, e.g.).

Patent Document 1: JP-A-2003-039976

In a vehicle having the conventional idle stop mechanism described above provided therein, a heavy current flows at the restart of an engine, thus momentarily reducing the battery voltage, sometimes the on-vehicle apparatuses thereof are reset and the restart processing thereof is executed because of the reduction in the battery voltage. When an ETC apparatus is mounted thereon as an on-vehicle apparatus, if the restart processing is executed, an authentication processing of an ETC card is carried out, and thus the vehicle stays in a state where the vehicle cannot pass the ETC gate for a few seconds. For this reason, when the driver began passing the ETC gate immediately after the restart of the engine, there occurs a problem that the ETC gate does not open. However, in the running controller disclosed in Patent Document 1, specific conditions for retrieving an ETC gate and control when a vehicle went to a state of standstill near the ETC gate due to congestion or the like are not considered. Thus the above-described problems cannot be solved.

The present invention has been made to solve the above-mentioned problems, and an object of the present invention is to provide an idle stop controller capable of excluding influences exerted upon on-vehicle apparatuses by the operations of an idle stop mechanism controlling the stop and the restart of an engine.

DISCLOSURE OF THE INVENTION

The idle stop controller according to the present invention, in order to solve the above-described problems, includes an idle stop mechanism controlling the stop and the restart of an engine; a vehicle location detecting section detecting a vehicle location; and a controller which, when an ETC gate has been retrieved within a predetermined region from a vehicle location detected by the vehicle location detecting section, prohibits the idle stop mechanism from stopping the engine, and which, when no ETC gate has been detected within the predetermined region, releases the prohibition, wherein the controller prohibits the stop of the engine to continue a setup thereof with respect to a vehicle-mounted appliance of which the setup is reset when the engine is restarted.

According to the idle stop controller of the present invention, the idle stop mechanism is arranged to be prohibited from stopping the engine when it is detected that a vehicle is present near an ETC gate. Thus, an on-vehicle appliance, e.g., an ETC apparatus can be prevented from being reset to thereby cause the restart processing to be carried out because of the reduction in the battery voltage upon restarting of the engine, and the influences exerted upon on-vehicle apparatuses by the operations of the idle stop mechanism controlling the stop and the restart of the engine can be excluded.

BEST MODE FOR CARRYING OUT THE INVENTION

Embodiments of the present invention will now be described with reference to the accompanying drawings in order to explain the present invention in more detail.

First Embodiment

Figure 1:
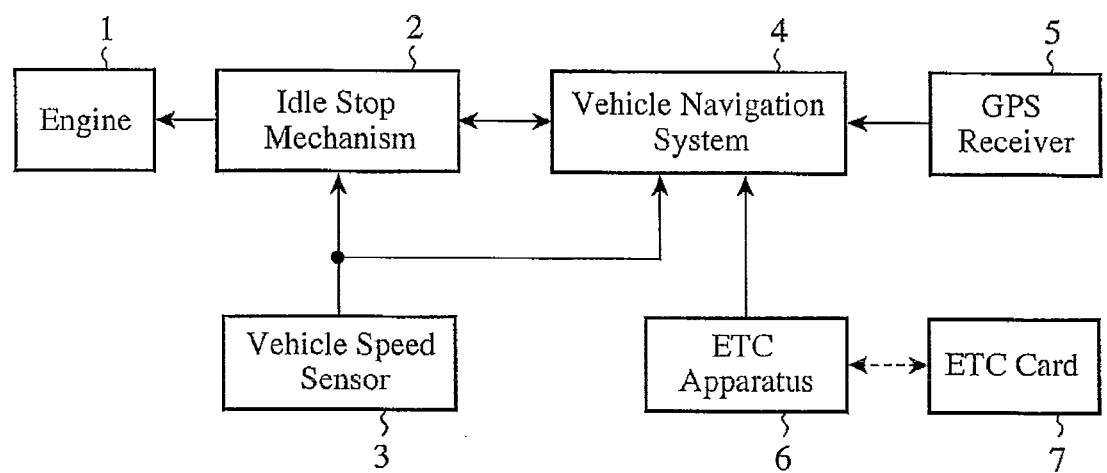
FIG. 1 is a block diagram showing the configuration of an idle stop controller in accordance with the first embodiment of the present invention.

FIG. 1 is a block diagram showing the configuration of an idle stop controller in accordance with the first embodiment of the present invention. The idle stop controller is composed of an engine 1, an idle stop mechanism 2, a vehicle speed sensor 3, a vehicle navigation system 4, a GPS (Global Positioning System) receiver 5, an ETC apparatus 6 serving as an on-vehicle appliance, and an ETC card 7.

The engine 1 is a power source for driving a vehicle. The stop or the restart of the engine 1 is controlled by the engine control signal sent from the idle stop mechanism 2.

The idle stop mechanism 2 generates the engine control signal based on the vehicle speed signal sent from the vehicle speed sensor 3 and the idle stop control signal sent from the vehicle navigation system 4, and sends the signal to the engine 1. The engine control signal controls the stop and the restart of the engine 1.

More specifically, when the idle stop control signal commanding the prohibition of the engine stop has not been sent from the vehicle navigation system 4, and further a vehicle speed signal representing the vehicle speed of zero is sent from the vehicle speed sensor 3, the idle stop mechanism 2 generates an engine control signal commanding an engine stop and sends the signal to the engine 1 to thus cause the engine 1 to stop. On the other hand, when a predetermined operation such as releasing the brakes, pressing down on the accelerator, or a manual start operation is carried out, regardless of the idle stop control signal sent from the vehicle navigation system 4, the idle stop mechanism 2 generates an engine control signal commanding the start of the engine 1 and sends the signal to the engine 1 to thus cause the engine 1 to restart.

The vehicle speed sensor 3 detects the travel speed of the vehicle based on the velocity pulse of the vehicle sent from the vehicle (not shown). The travel speed detected by the vehicle speed sensor 3 is sent to the idle stop mechanism 2 and the vehicle navigation system 4 as a vehicle speed signal. When the vehicle speed signal output from the vehicle speed sensor 3 indicates that the vehicle speed is zero, the vehicle is judged to be a stopping state.

The vehicle navigation system 4 corresponds to the controller of the present invention. The vehicle navigation system 4 has known navigation functions (these detailed descriptions are omitted) such as map displaying, route searching, route setting and route guidance, and also performs an ETC gate retrieval processing (details are described later) for retrieving an ETC gate based on the vehicle speed signal sent from the vehicle speed sensor 3, the current position signal sent from the GPS receiver 5, and the ETC state signal sent from the ETC apparatus 6, and further generates an idle stop control signal based on the result of the ETC gate retrieval processing. The idle stop control signal generated by the vehicle navigation system 4 is a signal commanding the prohibition of the engine stop or the release of the prohibition as mentioned above, and is sent to the idle stop mechanism 2.

The GPS receiver 5 corresponds to the vehicle location detecting section of the present invention. The GPS receiver 5 receives the electric wave sent from the GPS satellite, and detects the current position of the vehicle from the received signal obtained based on the received electric wave. The current position of the vehicle detected by the GPS receiver 5 is sent to the vehicle navigation system 4 as a current position signal.

As is well known, when the vehicle passes a gateway (toll gate) in a toll road while the ETC card 7 is inserted in the apparatus, the ETC apparatus 6 sends and receives automatic toll collection data concerning passing the toll gate to or from an ETC road side system (not shown) provided in the gateway, and thereby pays the toll. Further, the ETC apparatus 6 generates an ETC state signal indicating whether or not the ETC card 7 is inserted therein and the ETC apparatus 6 is set up, and sends the signal to the vehicle navigation system 4.

The ETC card 7 is an IC card used for paying a toll when the vehicle passes a gate provided in a toll road, and has stored therein information necessary for toll payment. The ETC function of the ETC apparatus 6 is effective only when the ETC card 7 is inserted therein.

Figure 2:
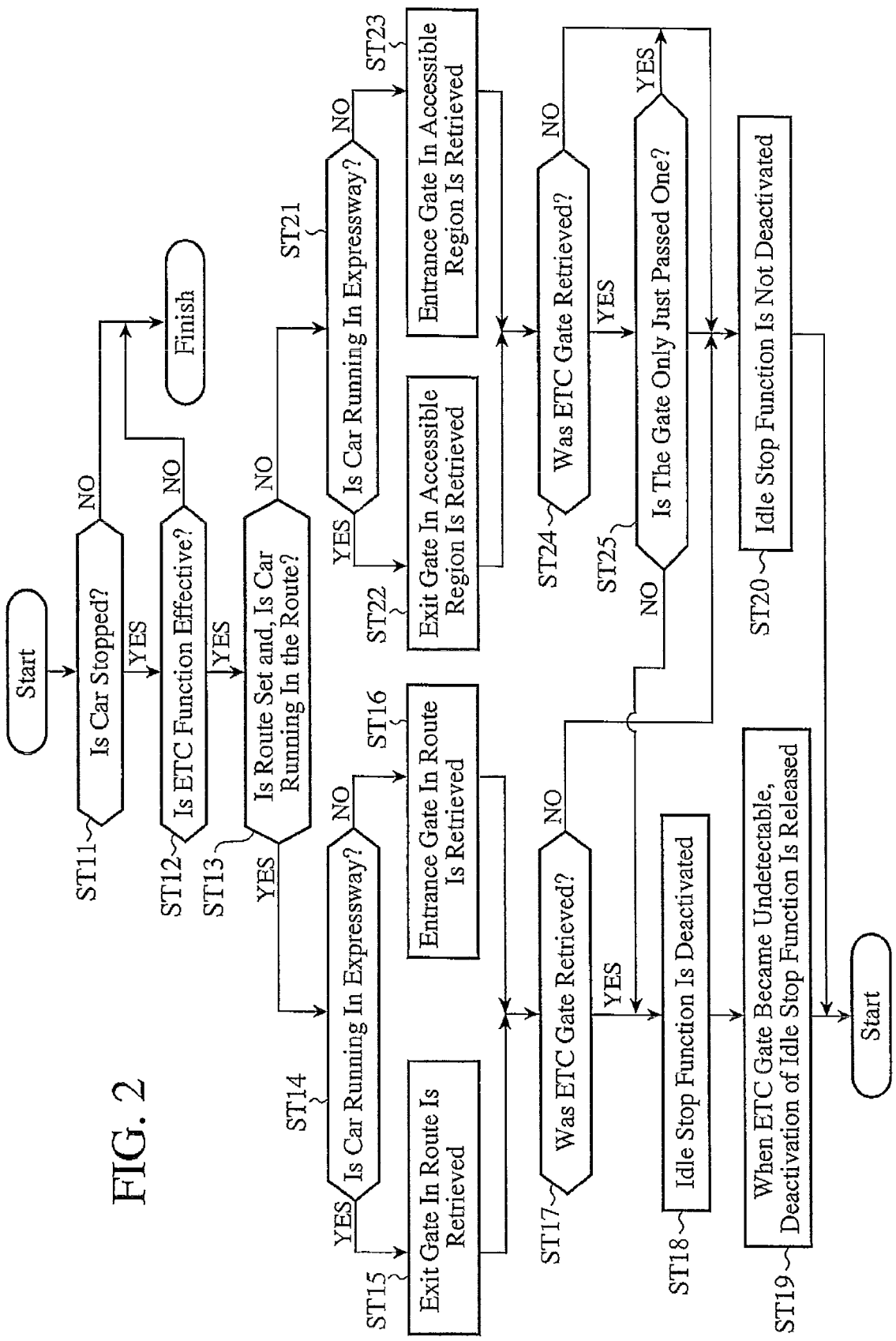
FIG. 2 is a flow chart for explaining the operations of the idle stop controller in accordance with the first embodiment of the present invention.

Then, an operation of the idle stop controller in accordance with the first embodiment of the present invention, thus arranged as stated above will be discussed, with ETC gate retrieval processing retrieving an ETC gate existing in the vicinity of a vehicle location as the center, by reference to the flowchart shown in FIG. 2.

In the ETC gate retrieval processing, first, it is checked whether or not the vehicle is stopped (step ST11). Specifically, the vehicle navigation system 4 acquires a vehicle speed signal from the vehicle speed sensor 3 to check whether or not the acquired vehicle speed signal shows that the vehicle is stopped (the vehicle speed is zero). In step ST11, in the case where it is judged that the vehicle is not stopped, that is, the vehicle is running in a state where the idle stop mechanism 2 does not work, in order to reduce the computing load exerted on the vehicle navigation system 4, step ST12 and the following processings are not performed, and the ETC gate retrieval processing is ended.

On the other hand, in step ST11, when the vehicle is judged to be stopped, it is subsequently checked whether or not the ETC function is effective (step ST12). Namely, the vehicle navigation system 4 acquires an ETC state signal from the ETC apparatus 6 to check whether or not the ETC state signal shows that the ETC function is effective, in other words, that the ETC apparatus 6 has been set up and further the ETC card 7 has been inserted in the ETC apparatus 6.

In the step ST12, when it is judged that the ETC function is not effective, that is, the ETC card 7 has not been inserted therein, or the ETC apparatus 6 has not been set up, it is not required that the occurrence of a situation where the ETC apparatus 6 is reset because of the reduction in the battery voltage at the engine restart be considered. Therefore, in order to reduce the operation load exerted on the vehicle navigation system 4, step ST13 and the following processings are not carried out, and the ETC gate retrieval processing exits.

On the other hand, in step ST12, when the ETC function is judged to be effective, it is next checked whether or not the route has been set and further the vehicle is running in the set route (step ST13). To be specific, by using the known navigation functions inherent in the system, the vehicle navigation system 4 checks whether or not the route to a destination has been set, and also whether or not the vehicle location shown by the vehicle location signal sent from the GPS receiver 5 is present in the set route.

In the step ST13, when it is judged that the route has been set and that the vehicle is running in the set route, it is subsequently checked whether or not the vehicle is running in an express way (step ST14). To be concrete, the vehicle navigation system 4 checks whether or not the vehicle location shown by the vehicle location signal sent from the GPS receiver 5 exists in the express way shown by the road data included in the map data read out from a map data storage unit (not shown).

In the step ST14, in the case where it is judged that the vehicle is running in the express way, since it is not possible for the vehicle to pass an entrance gate immediately after the engine is restarted, an ETC gate is retrieved with only exit gates existing in the route as a candidate for retrieval (step ST15). Specifically, the vehicle navigation system 4 retrieves an exit gate (ETC gate) existing in a region accessible in a fixed distance or in a fixed time period ahead in the running direction in the set route, based on the map data read out from the map data storage unit (not shown). Thereafter, the process proceeds to step ST17.

In the above step ST14, in the case where it is judged that the vehicle is not running in an express way, since it is recognized that the vehicle is running in a general road and it is impossible for the vehicle to pass an exit gate immediately after the restart of the engine, an ETC gate is retrieved with only entrance gates existing in the route as a candidate for retrieval (step ST16). Specifically, the vehicle navigation system 4 retrieves an entrance gate (ETC gate) existing in a region accessible in a fixed distance or in a fixed time period ahead in the running direction in the set route, based on the map data read out from the map data storage unit (not shown). Then, the process proceeds to step ST17.

In step ST17, it is checked whether or not an ETC gate has been retrieved. In other words, the vehicle navigation system 4 checks whether or not an ETC gate has been detected by the retrieval in step ST15 or step ST16. In the step ST17, when it is judged that an ETC gate has been retrieved, then, the deactivation of the idle stop function is executed (step ST18).

To be concrete, the vehicle navigation system 4 generates an idle stop control signal commanding the prohibition of the engine stop, and sends the signal to the idle stop mechanism 2. Thereby, even if the vehicle stops in front of an ETC gate, in other words, even if the vehicle speed signal sent from the vehicle speed sensor 3 shows that the vehicle speed is zero, the idle stop mechanism 2 does not stop the engine 1. The deactivation of the idle stop function is continued during conditions under which the ETC gate can be detected.

After that, when an ETC gate became undetectable, the deactivation of the idle stop function is released (step ST19). Namely, the vehicle navigation system 4 generates an idle stop control signal releasing the prohibition of the engine stop, and sends the signal to the idle stop mechanism 2. In this way, regardless of the presence or absence of an ETC gate, when the vehicle stops, in other words, when the vehicle speed signal sent from the vehicle speed sensor 3 shows the vehicle speed of zero, the idle stop mechanism 2 stops the engine 1. Thereafter, the ETC gate retrieval processing is ended.

In the above step ST17, when it is judged that no ETC gate has been retrieved, the processing deactivating the idle stop function is not executed (step ST20), and the ETC gate retrieval processing is finished. Thus, only the exit gate or the entrance gate existing in a region accessible in a fixed distance or in a fixed time period, forward in the running direction in the route, is retrieved, and even if the other gates exist in the vicinity thereof, the operation by the idle stop function is not prohibited. Thereby, the operation by the idle stop function can be restrained from being prohibited at the side of an unrelated ETC gate.

In the above step ST13, when it is judged that the route has not been set, or although the route has been set, the vehicle is not running in the set route, it is subsequently checked whether or not the vehicle is running in an express way (step ST21). To be concrete, the vehicle navigation system 4 checks whether or not the vehicle location shown by the vehicle location signal sent by the GPS receiver 5 exists in the express way shown by the road data included by the map data read out from the map data storage unit (not shown).

In the step ST21, when the vehicle is judged to be running in the express way, an ETC gate is retrieved with exit gates existing in an accessible region as a candidate for retrieval (step ST22). To be concrete, the vehicle navigation system 4 retrieves an exit gate (ETC gate) existing in a region accessible in distance or in time, calculated from the traveling direction of the vehicle or the route to the ETC gate, based on the map data read out from the map data storage unit (not shown). Thereafter, the process proceeds to step ST24.

On the other hand, in step ST21, when it is judged that the vehicle is not running in an express way, it is recognized that the vehicle is present in a general road, and an ETC gate is retrieved with entrance gates existing in an accessible region as a candidate for retrieval (step ST23). To be concrete, the vehicle navigation system 4 retrieves an entrance gate (ETC gate) existing in a region accessible in distance or in time, calculated from the traveling direction of the vehicle or the route to the ETC gate, based on the map data read out from the map data storage unit (not shown). Then, the process proceeds to step ST24.

In step ST24, it is checked whether or not an ETC gate has been retrieved. In other words, the vehicle navigation system 4 checks whether or not an ETC gate has been detected by the retrieval in step ST22 or step ST23. In the step ST24, when it is judged that no ETC gate has been retrieved, the processing deactivating the idle stop function is not executed (step ST20) as discussed above, and the ETC gate retrieval processing is finished.

On the other hand, in step ST24, when it is judged that an ETC gate has been retrieved, it is then checked whether or not the gate is the one which the vehicle has only just passed (step ST25). In the step ST25, when the gage is judged to be the one passed just before, the processing deactivating the idle stop function is not executed (step ST20) as discussed above, and the ETC gate retrieval processing is finished. Thereby, a situation can be avoided from occurring, in which the operation by the idle stop function is prohibited by the ETC gate, which was passed and does not require the deactivation of the idle stop function. On the other hand, in the step ST25, when it is judged that the gate is not the gate which has been only just passed, the process proceeds to step ST18, the processing deactivating the idle stop function is executed as discussed above.

As discussed above, according to the idle stop controller of the first embodiment of the present invention, when an ETC gate exists in the vicinity of a vehicle location, the deactivation of the idle stop function is executed. Thus, the on-vehicle ETC apparatus 6 can be prevented from being reset to afterward cause restart processing to be performed because of the reduction in the battery voltage at the engine restart, and further the appropriate retrieval of an ETC gate can be performed in response to vehicle location conditions or the setting conditions of the vehicle navigation system 4. Therefore, in the vehicle navigation system 4, an ETC gate can be retrieved by minimal operation.

It should be understood that in the first embodiment discussed above, an explanation is given of the case where the ETC apparatus 6 is mounted as an on-vehicle appliance; however, the present invention is not limited to the case where the ETC apparatus 6 is mounted but also similarly applicable to the case where another apparatus is mounted as an on-vehicle appliance, and in that case, advantages similar to those in the case where the ETC apparatus 6 is mounted can be provided.

INDUSTRIAL APPLICABILITY

As discussed above, the idle stop controller according to the present invention is arranged such that, when an ETC gate is retrieved in the vicinity of a vehicle location, the idle stop function is deactivated to prevent an ETC apparatus from being influenced, and thus the idle stop controller is suitable for use in on-vehicle navigation systems or the like.

The invention claimed is:

1. An idle stop controller including:
   an idle stop mechanism controlling the stop and the restart of an engine;
   an ETC device that generates an ETC signal state indicating whether or not an ETC card is present in the ETC device;
   a vehicle location detecting section detecting a vehicle location; and
   a controller that prohibits the idle stop mechanism from stopping the engine, when a condition of an ETC gate has been retrieved within a predetermined region from a vehicle location detected by the vehicle location detecting section and the ETC signal state indicates the presence of an ETC card, and that releases the prohibition when no ETC gate has been detected within the predetermined region.

2. The idle stop controller according to claim 1, wherein the controller is provided by a vehicle navigation system, and wherein the vehicle navigation system retrieves an ETC gate within an accessible region calculated from the distance to the ETC gate or from the traveling direction of a vehicle and the route to the ETC gate.

3. The idle stop controller according to claim 2, wherein the vehicle navigation system has the route to a destination set therein and wherein when the vehicle location detected by the vehicle location detecting section is present in the route, the vehicle navigation system selects only ETC gates existing within a region accessible within a fixed distance from the vehicle location or within a fixed time period forward in the route as a candidate for retrieval.

4. The idle stop controller according to claim 2, wherein the controller includes a vehicle speed sensor detecting a vehicle speed and wherein only when the vehicle speed sensor detected that the vehicle is stopped, the vehicle navigation system retrieves an ETC gate.

5. The idle stop controller according to claim 2, wherein the vehicle navigation system retrieves an ETC gate, with only entrance gates as a candidate for retrieval when the vehicle location detected by the vehicle location detecting section is present in a general road, and further with only exit gates as a candidate for retrieval when the vehicle location is present in an express way.

6. The idle stop controller according to claim 2, wherein the vehicle navigation system removes the ETC gate which has been passed immediately before from a candidate for retrieval.

7. The idle stop controller according to claim 2, wherein when an ETC function has been deactivated, no vehicle navigation system commands the idle stop mechanism to prohibit the stop of an engine.

\* \* \* \* \*